(12) United States Patent
Haravu et al.

(10) Patent No.: US 10,564,885 B1
(45) Date of Patent: Feb. 18, 2020

(54) DATA STORAGE SYSTEM WITH FREE STORAGE SPACE MANAGEMENT USING POLICY-BASED COPY HARVESTING FUNCTIONALITY

(71) Applicant: EMC IP Holding Company LLC, Hopkinton, MA (US)

(72) Inventors: Nagasimha Haravu, Apex, NC (US); Michael Zeldich, Newton, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 189 days.

(21) Appl. No.: 15/663,195

(22) Filed: Jul. 28, 2017

(51) Int. Cl.
*G06F 12/00* (2006.01)
*G06F 3/06* (2006.01)

(52) U.S. Cl.
CPC ............ *G06F 3/0652* (2013.01); *G06F 3/067* (2013.01); *G06F 3/0608* (2013.01)

(58) Field of Classification Search
None
See application file for complete search history.

(56) References Cited

U.S. PATENT DOCUMENTS

| | | | | |
|---|---|---|---|---|
| 2009/0319585 | A1* | 12/2009 | Gokhale | G06F 16/9574 |
| 2015/0052100 | A1* | 2/2015 | Calkowski | G06F 16/1873 |
| | | | | 707/608 |
| 2015/0127902 | A1* | 5/2015 | Shah | G06F 3/0689 |
| | | | | 711/114 |

* cited by examiner

*Primary Examiner* — Jason W Blust
(74) *Attorney, Agent, or Firm* — Ryan, Mason & Lewis, LLP

(57) ABSTRACT

A set of one or more logical storage units is provisioned in a data storage system. Each logical storage unit is provisioned with a given storage capacity. A set of one or more object rules is applied to objects stored in the set of one or more logical storage units. The set of one or more object rules is configured to maintain available free storage space in each of the set of one or more logical storage units: (i) consistent with a desired free storage space level and an acceptable free storage space level; and (ii) consistent with an object retention policy comprising a desired retention time value and an acceptable retention time value for a given object.

19 Claims, 4 Drawing Sheets

DATA STORAGE SYSTEM WITH FREE STORAGE SPACE MANAGEMENT USING POLICY-BASED COPY HARVESTING FUNCTIONALITY

FIELD

The field relates generally to data storage systems, and more particularly to techniques for management of free storage space in such data storage systems.

BACKGROUND

Data storage systems typically provide for the ability to create snapshots of data stored thereon based on some schedule, and persist them locally or back them up or archive them to remote data storage systems. When the snapshots are persisted locally, the storage used for data protection is shared with the storage used for production applications. When the snapshots are backed up or archived remotely, an exclusive protection space is created. In all these scenarios, the need to protect data for longer periods of time results in more storage consumed, and safeguards need to be put in place to ensure the storage systems do not run out of free storage space.

SUMMARY

Embodiments of the invention provide free storage space management using policy-based copy harvesting functionality in data storage systems.

In one illustrative embodiment, a method comprises the following steps. A set of one or more logical storage units is provisioned in a data storage system. Each logical storage unit is provisioned with a given storage capacity. A set of one or more object rules is applied to objects stored in the set of one or more logical storage units. The set of one or more object rules is configured to maintain available free storage space in each of the set of one or more logical storage units: (i) consistent with a desired free storage space level and an acceptable free storage space level; and (ii) consistent with an object retention policy comprising a desired retention time value and an acceptable retention time value for a given object.

For example, the available free space is maintained consistent with the desired free storage space level and the acceptable free storage space level by deleting one or more objects stored in a given one of the set of one or more logical storage units subject to the object retention policy. The one or more objects deleted may comprise one or more snapshots.

By way of further example, one or more objects stored in a given one of the set of one or more logical storage units may be deleted when the available free space is at or below the acceptable free storage space level and the acceptable retention time for a given object to be deleted has expired. The deleting step is stopped when the level of available free space is at or above the desired free storage space level.

Additional embodiments perform one or more of the above steps in accordance with an apparatus or system comprising one or more processing devices, and in accordance with an article of manufacture or computer program product.

These and other features and advantages of the invention will become more readily apparent from the accompanying drawings and the following detailed description.

DETAILED DESCRIPTION

Figure 1:
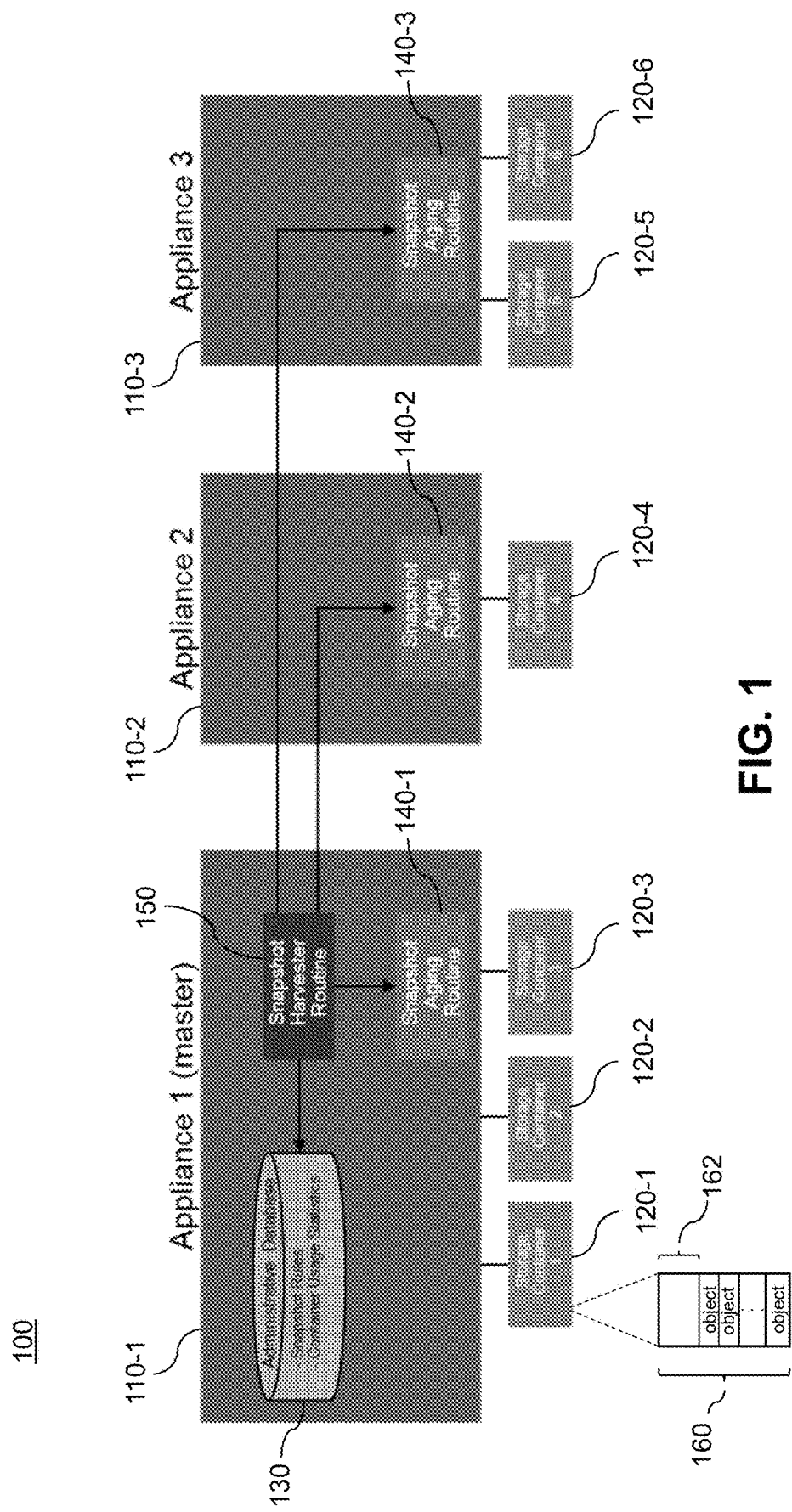
FIG. 1 illustrates a data storage system with policy-based snapshot harvesting functionality according to an illustrative embodiment.

Illustrative embodiments will be described herein with reference to exemplary data storage systems (more generally referred to herein as "information processing systems") and associated host devices, storage devices and other processing devices. It is to be appreciated, however, that embodiments are not restricted to use with the particular illustrative system and device configurations shown. Accordingly, the terms "data storage system" and "information processing system" as used herein are intended to be broadly construed, so as to encompass, for example, processing systems comprising cloud computing and storage systems, non-cloud computing and storage systems, as well as other types of processing systems comprising various combinations of physical and/or virtual processing resources.

In one non-limiting example, an information processing system or data storage system may comprise a cloud infrastructure hosting multiple tenants that share cloud resources. Such cloud infrastructure is considered an example of what is more generally referred to as a cloud computing environment. Some cloud infrastructures are within the exclusive control and management of a given enterprise, and therefore are considered "private clouds." The term "enterprise" as used herein is intended to be broadly construed, and may comprise, for example, a business or any other entity, group, or organization. On the other hand, cloud infrastructures that are used by multiple enterprises, and not necessarily controlled or managed by any of the multiple enterprises but rather are respectively controlled and managed by third-party cloud providers, are typically considered "public clouds." Thus, enterprises can choose to host their applications or services on private clouds, public clouds, and/or a combination of private and public clouds (hybrid clouds). It is to be understood, however, that illustrative embodiments are not limited to any particular computing infrastructure or environment mentioned herein.

As mentioned above in the background with respect to storing snapshots associated with data storage systems, the need to protect data for long periods of time results in more storage consumed, thus necessitating that safeguards be put in place to ensure the data storage systems do not run out of storage space. Illustrative embodiments provide systems and methods for managing free storage space through policy-based snapshot harvesting functionality.

Before describing illustrative embodiments of policy-based snapshot harvesting functionality, features associated with an illustrative data storage system within which such policy-based snapshot harvesting functionality can be implemented will be described.

An application's data is typically contained in a logical unit (LUN), virtual volume, or a file system, all of which can be abstracted as a primary storage object. A snapshot is a read-only, point-in-time copy of the primary storage object and is modeled as a secondary storage object. A primary storage object and its snapshots together form a family. Storage objects within a family can share data blocks within a data storage system. Storage objects can also share their data blocks with other storage objects within the same system through deduplication.

A storage container is a logical storage unit for storing one or more storage objects. In one non-limiting example, all members of a family reside in the same storage container. Thus, the primary storage object and its local snapshots may be stored in the same container on the production system, whereas a backup container on a remote backup system or an archive container on an archival system will contain the backed-up and archived snapshots respectively. As used herein, the "production" system is the part of a data storage system in which primary data (e.g., original data from one or more hosted applications and local snapshots of the original data) is stored, as compared with backup or archived data which are stored on backup or archive systems, respectively.

A storage container may span one or more physical appliances in the storage, backup, or archival system. The total available space of a container is the sum of the container's available space at each of the appliances. A storage container is provisioned a fixed amount of storage spanning these appliances. Expansion of such storage may not be readily possible due to time or budget constraints. Therefore, it is important that a certain amount of free space is always maintained for healthy operation of the system.

In one illustrative embodiment, two configurable attributes, referred to as "desired free space" and "acceptable free space," are available on each storage container. These attributes, specified as a percentage of total provisioned container storage, serve as a high watermark and low watermark guidance for the data storage system.

In illustrative embodiments, the data storage system is configured to maintain the available free space above the acceptable free space limit at each of its appliances. When the available free space decreases and reaches the acceptable free space limit, certain snapshots will be deleted from the container thereby freeing up space in the container. This process continues until the available free space increases and reaches the desired free space limit. This process is called "snapshot harvesting."

Further, in illustrative embodiments, a data protection policy can be composed of a local snapshot ruleset, a backup ruleset, and an archival ruleset. The local snapshot ruleset governs the frequency in which snapshots are created and retained on the local (production) system. The backup ruleset governs the frequency in which snapshots are created and retained on a remote backup system. The archival ruleset governs the frequency in which snapshots are created and retained on a remote archival system.

In one example, all of the rulesets can have up to two rules. An hourly rule indicates the frequency, measured in hours, at which snapshots are taken. A daily/weekly rule identifies a time-of-day and one or more days of the week at which the snapshot is taken. A "snapshot interval" attribute, available with each rule and derived from the rule settings, identifies the lowest frequency at which the snapshot is taken. For an hourly rule, the snapshot interval is simply the number of hours between each snapshot. For a daily/weekly rule, the snapshot interval is the largest gap between snapshots.

For example, if the hourly rule specifies a snapshot to be taken every four hours, its snapshot interval is four hours. Likewise, if a daily/weekly rule specifies a snapshot to be taken at midnight on Saturdays and Sundays of every week, its snapshot interval is six days. Each rule also specifies a snapshot retention period in hours, days, weeks, months, or years. In illustrative embodiments, the retention is specified using two attributes, referred to as "desired retention" and "acceptable retention," with the desired retention always being longer than the acceptable retention. A data storage system configured according to one or more illustrative embodiments retains the snapshots as specified in the desired retention policy, but may choose to delete some of the snapshots more aggressively as part of snapshot harvesting while ensuring the acceptable retention policy is not violated.

Thus, in summary with respect to illustrative embodiments described above:

(i) A policy may have one local snapshot ruleset, one backup ruleset, and one archival ruleset.

(ii) Each ruleset may have one hourly rule, and one daily/weekly rule.

(iii) An hourly rule has: a frequency specified in hours; and a snapshot interval attribute defined in hours.

(iv) A daily/weekly rule has: a frequency defined in time-of-day and day-of-week; and a snapshot interval attribute defined in days.

(v) Both rules have: desired retention; and acceptable retention.

Accordingly, a storage container hosting one or more primary storage objects can be paired with a remote backup container, and a remote archival container. When a data protection policy is applied to an application, all of the storage objects that are part of the application are protected by the policy. This results in snapshots being created locally at various intervals and retained either in the local container, or one of the remote containers, or both. Each such snapshot has attributes that identify the policy as well as the specific rule in the policy that is responsible for creating the snapshot. A policy-based snapshot is associated with one and only one rule.

When a rule is applied to a primary storage object resulting in one or more of its snapshots being stored in a container within an appliance of local or remote system, a three-way relationship is created between the container, the appliance, and the rule. This relationship is referred to as the container-appliance-rule triplet. An attribute, referred to as "effective retention," is tracked on this relationship and is initially assigned a value of the rule's desired retention.

For each container-appliance-rule triplet, a snapshot aging routine is periodically run against all storage objects that are subjected by the rule. If any storage object has snapshots that fall outside of the container-appliance-rule's effective retention, such snapshots are deleted from the system.

The deleted snapshots could be residing either locally on the production system, or on a backup or archive system. Depending on the type of system from where the snapshots are deleted, a garbage collection routine may optional be run to reclaim the freed-up storage.

Accordingly, snapshot harvesting functionality according to an illustrative embodiment operates as follows.

When the available free space of an appliance's storage container falls below the acceptable free space, the following logic (set of steps) is executed in accordance with an illustrative embodiment.

1. A list of rules that operate on storage objects residing in the appliance's storage container is gathered.
2. The effective retention for the container-appliance-rule associated with the rules are reduced by their snapshot interval value so long as the new effective retention does not fall below the rule's acceptable retention.
3. If the effective retention was indeed reduced, aging routine is run for that container-appliance-rule triplet.
4. Steps 2-4 are repeated until the available free space reaches the desired free space, or if effective retention was not reduced in step 2.

The above features and advantages will be further explained in the context of FIGS. 1-4.

Referring now to FIG. 1, a data storage system 100 according to an illustrative embodiment is depicted with the above-described policy-based snapshot harvesting functionality. As shown in this illustrative embodiment, data storage system 100 comprises a cluster of three storage appliances 110-1 (Appliance 1), 110-2 (Appliance 2), and 110-3 (Appliance 3). It is to be understood that the number of storage appliances depicted in FIG. 1 is for illustration purposes and not intended to be limiting. Also, it is to be appreciated that the storage appliances 110-1, 110-2, and 110-3 can be appliances that are part of a production storage system, a backup storage system, an archival storage system, or some combination thereof.

One of the storage appliances, storage appliance 110-1, has been designated as a "master" appliance. Each storage appliance exposes one or more storage containers which may be of varying sizes. By way of example only, as shown in FIG. 1: storage appliance 110-1 exposes storage containers 120-1 (Storage Container 1), storage container 120-2 (Storage Container 2), and storage container 120-3 (Storage Container 3); storage appliance 110-2 exposes storage container 120-4 (Storage Container 4); and storage appliance 110-3 exposes storage containers 120-5 (Storage Container 5) and storage container 120-6 (Storage Container 6). As explained above, storage containers persist application data as well as snapshot copies in them.

Further, it is to be appreciated that while each storage container in FIG. 1 is illustrated as being associated with a specific storage appliance, a given storage container can span more than one storage appliance.

The master appliance (storage appliance 110-1) is configured with an administrative database 130 that persists a set of snapshot rules and storage container usage statistics. As described above, snapshot rules apply to one or more application objects. A snapshot aging routine resides on each container, i.e.: snapshot aging routine 140-1 resides on storage appliance 110-1, snapshot aging routine 140-2 resides on storage appliance 110-2, and snapshot aging routine 140-3 resides on storage appliance 110-3. Each snapshot aging routine can be invoked (by a snapshot harvester routine described below) by passing in a snapshot rule and an associated effective retention value. The snapshot aging routine applies the rules and attributes specified by the snapshot harvester routine. Each snapshot aging routine 140 can be considered a snapshot aging module.

A snapshot harvester routine runs 150 on the master appliance. Routine 150 can be considered a policy-based snapshot harvesting controller (or, more generally, a controller). The snapshot harvester routine 150 periodically consults the administrative database 130 for the container usage statistics, and if storage needs to be reclaimed on a given one of the storage containers (120-1 through 120-6) based on the above-described desired free storage space level and acceptable free storage space level policy, the snapshot harvester routine 150 invokes the snapshot aging routine (140) on the appliance (110) that hosts the given one of the storage containers. By way of further example, storage container 120-1 illustrates its total provisioned storage capacity as 160 and free storage space is illustrated as 162. Each other storage container represented in FIG. 1 can be similarly configured. The portion of the provisioned storage capacity 160 not available but rather currently storing objects is considered the used storage space. One or more of the objects illustrated in storage container 120-1 (or any of the other storage containers) may be snapshots subject to the policy-based harvesting (deletion to reclaim storage space) techniques described herein.

Given the illustrative data storage system 100 in FIG. 1 and the above-described features and advantages, various snapshot (or, more generally, object) harvesting methodologies are described below in the context of FIGS. 2 and 3.

Figure 2:
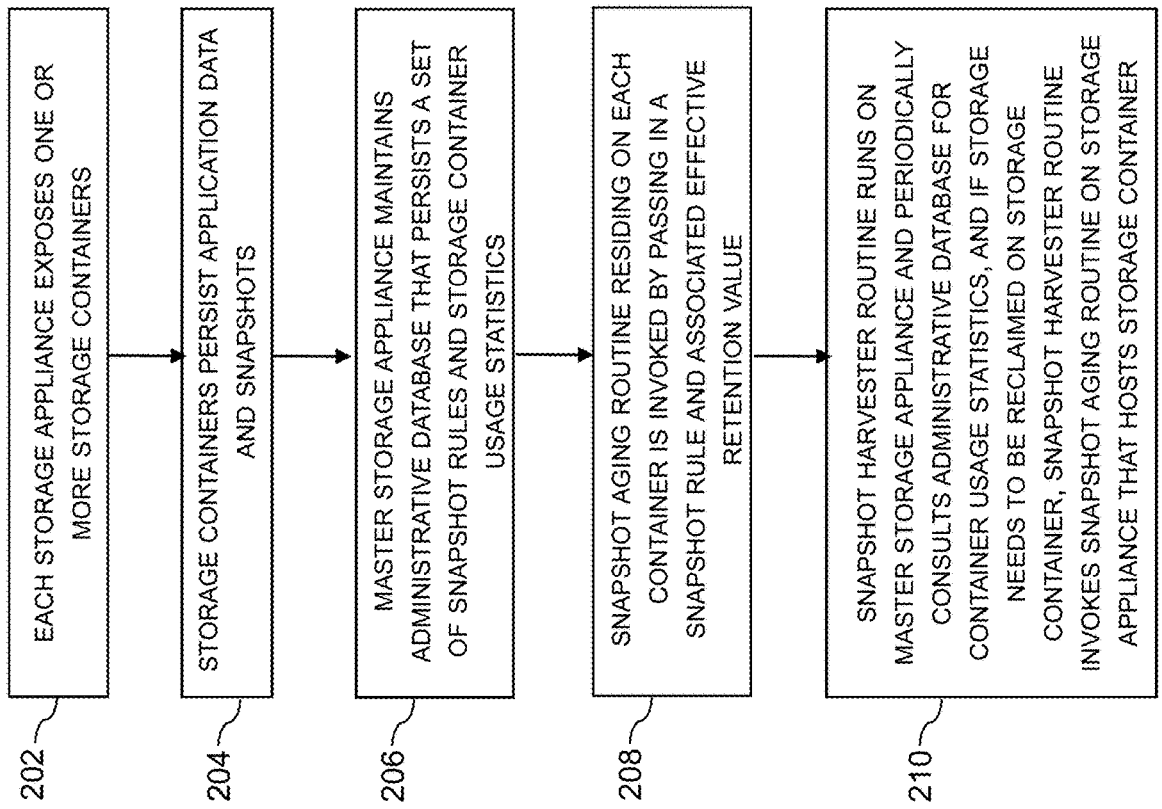
FIG. 2. illustrates a methodology for policy-based snapshot harvesting functionality according to an illustrative embodiment.

FIG. 2. illustrates a methodology 200 for policy-based snapshot harvesting functionality according to an illustrative embodiment.

In step 202, each storage appliance exposes one or more storage containers.

In step 204, the storage containers persist application data and snapshots.

In step 206, a master storage appliance maintains an administrative database that persists a set of snapshot rules and storage container usage statistics.

In step 208, a snapshot aging routine residing on each container is invoked by passing in a snapshot rule and associated effective retention value.

In step 210, a snapshot harvester routine runs on the master storage appliance and periodically consults the administrative database for container usage statistics. If storage needs to be reclaimed on a given storage container, the snapshot harvester routine invokes the snapshot aging routine on the given storage appliance that hosts the storage container.

Figure 3:
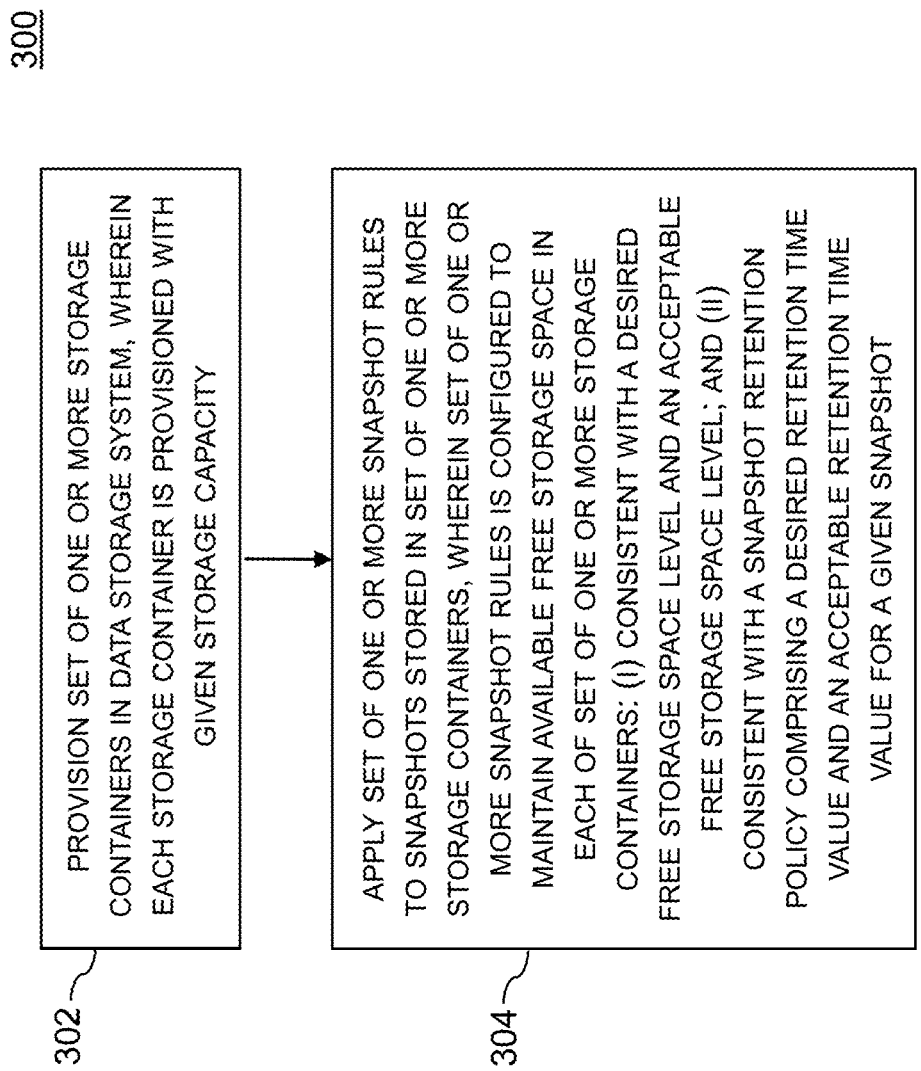
FIG. 3. illustrates a methodology for policy-based snapshot harvesting functionality according to another illustrative embodiment.

FIG. 3. illustrates a methodology 300 for policy-based snapshot harvesting functionality according to another illustrative embodiment.

In step 302, a set of one or more logical storage units is provisioned in a data storage system, wherein each logical storage unit is provisioned with a given storage capacity.

In step 304, a set of one or more snapshot rules is applied to snapshots stored in the set of one or more storage containers, wherein the set of one or more snapshot rules is configured to maintain available free storage space in each of the set of one or more storage containers: (i) consistent with a desired free storage space level and an acceptable free storage space level; and (ii) consistent with an object retention policy comprising a desired retention time value and an acceptable retention time value for a given snapshot.

At least portions of the data storage system with policy-based snapshot harvesting functionality shown in FIGS. 1-3 may be implemented using one or more processing platforms associated with one or more information processing systems. In some embodiments, a given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one. In many embodiments, logic may be executed across one or more physical or virtual processors. In certain embodiments, a virtual processor may be mapped to and executed on or across a portion of one or more virtual or physical processors. An illustrative embodiment of a processing platform will now be described in greater detail in conjunction with FIG. 4.

As is apparent from the above, one or more of the processing modules or other components of the data storage system with policy-based snapshot harvesting functionality shown in FIGS. 1-3 may each run on a computer, server, storage device or other processing platform element. A given such element may be viewed as an example of what is more generally referred to herein as a "processing device." An example of such a processing platform is processing platform 400 shown in FIG. 4.

The processing platform 400 in this embodiment comprises a plurality of processing devices, denoted 402-1, 402-2, 402-3, . . . 402-N, which communicate with one another over a network 404.

The network 404 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

Some networks utilized in a given embodiment may comprise high-speed local networks in which associated processing devices communicate with one another utilizing Peripheral Component Interconnect Express (PCIe) cards of those devices, and networking protocols such as InfiniB and, Gigabit Ethernet or Fibre Channel.

The processing device 402-1 in the processing platform 400 comprises a processor 410 coupled to a memory 412.

The processor 410 may comprise a microprocessor, a microcontroller, an application-specific integrated circuit (ASIC), a field-programmable gate array (FPGA) or other type of processing circuitry, as well as portions or combinations of such circuitry elements.

The memory 412 may comprise random access memory (RAM), read-only memory (ROM) or other types of memory, in any combination. The memory 412 and other memories disclosed herein should be viewed as illustrative examples of what are more generally referred to as "processor-readable storage media" storing executable program code of one or more software programs.

Articles of manufacture comprising such processor-readable storage media are considered embodiments of the present disclosure. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Figure 4:
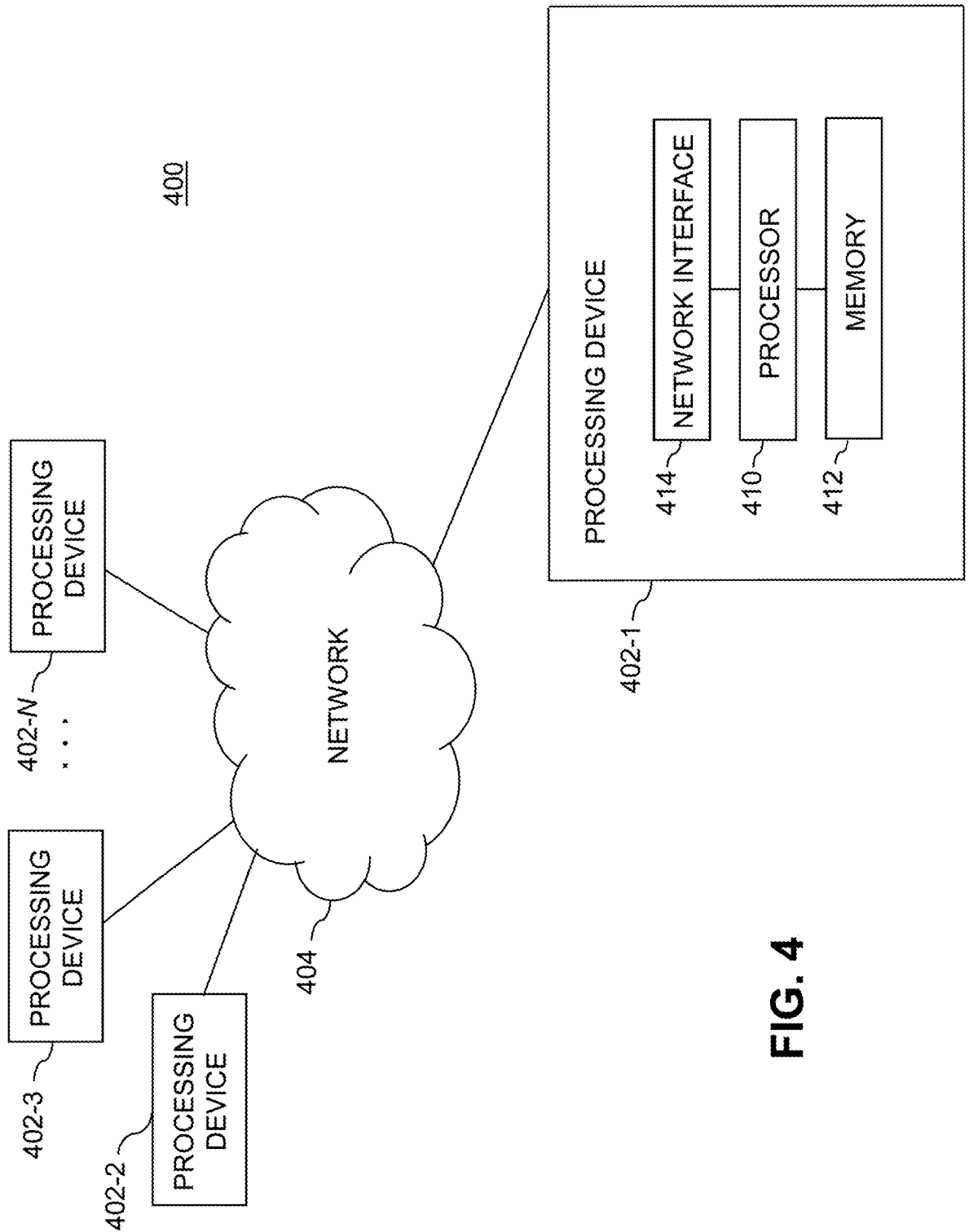
FIG. 4 illustrates an example of a processing platform that may be utilized to implement at least a portion of a data storage system with policy-based snapshot harvesting functionality according to an illustrative embodiment.

Also included in the processing device 402-1 of the example embodiment of FIG. 4 is network interface circuitry 414, which is used to interface the processing device with the network 404 and other system components, and may comprise conventional transceivers.

The other processing devices 402 of the processing platform 400 are assumed to be configured in a manner similar to that shown for processing device 402-1 in the figure.

Again, this particular processing platform is presented by way of example only, and other embodiments may include additional or alternative processing platforms, as well as numerous distinct processing platforms in any combination, with each such platform comprising one or more computers, servers, storage devices or other processing devices.

For example, other processing platforms used to implement embodiments of the disclosure can comprise different types of virtualization infrastructure, in place of or in addition to virtualization infrastructure comprising virtual machines. Such virtualization infrastructure illustratively includes container-based virtualization infrastructure configured to provide Docker containers or other types of Linux containers (LXCs).

The containers may be associated with respective tenants of a multi-tenant environment, although in other embodiments a given tenant can have multiple containers. The containers may be utilized to implement a variety of different types of functionality within the system. For example, containers can be used to implement respective cloud compute nodes or cloud storage nodes of a cloud computing and storage system. The compute nodes or storage nodes may be associated with respective cloud tenants of a multi-tenant environment. Containers may be used in combination with other virtualization infrastructure such as virtual machines implemented using a hypervisor.

As another example, portions of a given processing platform in some embodiments can comprise converged infrastructure such as VxRail™, VxRack™ or Vblock® converged infrastructure commercially available from VCE, the Virtual Computing Environment Company, now the Converged Platform and Solutions Division of Dell EMC. For example, portions of an information storage system of the type disclosed herein can be implemented utilizing converged infrastructure.

It should therefore be understood that in other embodiments different arrangements of additional or alternative elements may be used. In many embodiments, at least a subset of these elements may be collectively implemented on a common processing platform, or each such element may be implemented on a separate processing platform.

Also, in other embodiments, numerous other arrangements of computers, servers, storage devices or other components are possible in the data storage system with policy-based snapshot harvesting functionality. Such components can communicate with other elements of the system over any type of network or other communication media.

As indicated previously, in some embodiments, components of the data storage system with policy-based snapshot harvesting functionality as disclosed herein can be implemented at least in part in the form of one or more software programs stored in memory and executed by a processor of a processing device. For example, at least portions of the execution environment or other system components are illustratively implemented in one or more embodiments the form of software running on a processing platform comprising one or more processing devices.

It should again be emphasized that the above-described embodiments of the disclosure are presented for purposes of illustration only. Many variations and other alternative embodiments may be used. For example, the disclosed techniques are applicable to a wide variety of other types of data storage systems and information processing systems. Also, the particular configurations of system and device elements, associated processing operations and other functionality illustrated in the drawings can be varied in other embodiments. Moreover, the various assumptions made above in the course of describing the illustrative embodiments should also be viewed as exemplary rather than as requirements or limitations of the embodiments. Numerous other alternative embodiments within the scope of the appended claims will be readily apparent to those skilled in the art.

What is claimed is:

1. A method comprising:
provisioning a set of one or more logical storage units in a data storage system, each logical storage unit being provisioned with a given storage capacity, the set of one or more logical storage units comprising a set of one or more storage containers, the set of one or more storage containers being associated with a set of one or more storage appliances of the data storage system;
applying a set of one or more object rules to objects stored in the set of one or more logical storage units, wherein the set of one or more object rules is configured to maintain available free storage space in each of the set of one or more logical storage units: (i) consistent with a desired free storage space level and an acceptable free storage space level; and (ii) consistent with an object retention policy comprising a desired retention time value and an acceptable retention time value for a given object;
for a given object, creating a relationship between a given container, a given storage appliance and a given object rule;
tracking an effective retention time for the given object based on the relationship created for the given container, the given storage appliance and the given object rule; and
reducing the effective retention time for the given object by a given object interval value if the effective retention time does not fall below the acceptable retention time;
wherein the above steps are performed by one or more processing devices.

2. The method of claim 1, wherein the desired free storage space level represents a first percentage of the given storage capacity provisioned for a logical storage unit to be maintained as available free space, wherein the acceptable free storage space level represents a second percentage of the given storage capacity provisioned for a logical storage unit to be maintained as available free space, and wherein the first percentage is larger than the second percentage.

3. The method of claim 1, wherein the desired retention time value is larger than the acceptable retention time value.

4. The method of claim 1, wherein the maintaining the available free space consistent with a desired free storage space level and an acceptable free storage space level further comprises deleting one or more objects stored in a given one of the set of one or more logical storage units subject to the object retention policy.

5. The method of claim 4, wherein the one or more objects deleted comprise one or more snapshots.

6. The method of claim 4, wherein the deleting step further comprises:
deleting one or more objects stored in a given one of the set of one or more logical storage units when the available free space is at or below the acceptable free storage space level and the acceptable retention time for a given object to be deleted has expired; and
stopping the deleting step when the level of available free space is at or above the desired free storage space level.

7. The method of claim 1, wherein the set of one or more storage appliances comprise one or more of a production storage system, a backup storage system, and an archival storage system.

8. An article of manufacture comprising a non-transitory processor-readable storage medium having stored therein program code of one or more software programs, wherein the program code when executed by one or more processing devices causes said one or more processing devices to:
provision a set of one or more logical storage units in a data storage system, each logical storage unit being provisioned with a given storage capacity, the set of one or more logical storage units comprising a set of one or more storage containers, the set of one or more storage containers being associated with a set of one or more storage appliances of the data storage system;
apply a set of one or more object rules to objects stored in the set of one or more logical storage units, wherein the set of one or more object rules is configured to maintain available free storage space in each of the set of one or more logical storage units: (i) consistent with a desired free storage space level and an acceptable free storage space level; and (ii) consistent with an object retention policy comprising a desired retention time value and an acceptable retention time value for a given object;
for a given object, create a relationship between a given container, a given storage appliance and a given object rule;
track an effective retention time for the given object based on the relationship created for the given container, the given storage appliance and the given object rule; and
reduce the effective retention time for the given object by a given object interval value if the effective retention time does not fall below the acceptable retention time.

9. The article of manufacture of claim 8, wherein maintaining the available free space consistent with a desired free storage space level and an acceptable free storage space level further comprises deleting one or more objects stored in a given one of the set of one or more logical storage units subject to the object retention policy.

10. The article of manufacture of claim 9, wherein the one or more objects deleted comprise one or more snapshots.

11. The article of manufacture of claim 9, wherein deletion of one or more objects further comprises:
deleting one or more objects stored in a given one of the set of one or more logical storage units when the available free space is at or below the acceptable free storage space level and the acceptable retention time for a given object to be deleted has expired; and
stopping the deleting step when the level of available free space is at or above the desired free storage space level.

12. The article of manufacture of claim of claim 8, wherein the desired free storage space level represents a first percentage of the given storage capacity provisioned for a logical storage unit to be maintained as available free space, wherein the acceptable free storage space level represents a second percentage of the given storage capacity provisioned for a logical storage unit to be maintained as available free space, and wherein the first percentage is larger than the second percentage.

13. The article of manufacture of claim of claim 8, wherein the desired retention time value is larger than the acceptable retention time value.

14. A system, comprising:
a set of one or more storage appliances;
a set of one or more logical storage units exposed by the set of one or more storage appliances, each logical storage unit being provisioned with a given storage capacity, the set of one or more logical storage units comprising a set of one or more storage containers, the set of one or more storage containers being associated with a set of one or more storage appliances of the data storage system; and
a controller configured to apply a set of one or more object rules to objects stored in the set of one or more logical storage units, wherein the set of one or more object rules is configured to maintain available free storage space in each of the set of one or more logical storage units: (i) consistent with a desired free storage space level and an acceptable free storage space level; and (ii) consistent with an object retention policy comprising a desired retention time value and an acceptable retention time value for a given object;
wherein the controller is further configured to:
create, for a given object, a relationship between a given container, a given storage appliance and a given object rule;
track an effective retention time for the given object based on the relationship created for the given container, the given storage appliance and the given object rule; and
reduce the effective retention time for the given object by a given object interval value if the effective retention time does not fall below the acceptable retention time;
wherein the above components of the system are implemented by one or more processing devices.

15. The system of claim 14, wherein maintaining the available free space consistent with a desired free storage space level and an acceptable free storage space level further comprises deleting one or more objects stored in a given one of the set of one or more logical storage units subject to the object retention policy.

16. The system of claim 15, wherein the one or more objects deleted comprise one or more snapshots.

17. The system of claim 15, wherein deletion of one or more objects further comprises:
deleting one or more objects stored in a given one of the set of one or more logical storage units when the available free space is at or below the acceptable free storage space level and the acceptable retention time for a given object to be deleted has expired; and
stopping the deleting step when the level of available free space is at or above the desired free storage space level.

18. The system of claim 14, wherein the desired free storage space level represents a first percentage of the given storage capacity provisioned for a logical storage unit to be maintained as available free space, wherein the acceptable free storage space level represents a second percentage of the given storage capacity provisioned for a logical storage unit to be maintained as available free space, and wherein the first percentage is larger than the second percentage.

19. The system of claim 14, wherein the desired retention time value is larger than the acceptable retention time value.

* * * * *